US009237166B2

(12) United States Patent
Bennett (10) Patent No.: US 9,237,166 B2
(45) Date of Patent: Jan. 12, 2016

(54) INTERNET SEARCH ENGINE PREVENTING VIRUS EXCHANGE

(75) Inventor: James D. Bennett, Hroznetin (CZ)

(73) Assignee: RPX Corporation, San Francisco, CA (US)

( * ) Notice: Subject to any disclaimer, the term of this patent is extended or adjusted under 35 U.S.C. 154(b) by 1016 days.

(21) Appl. No.: 12/372,589

(22) Filed: Feb. 17, 2009

(65) Prior Publication Data

US 2009/0287653 A1    Nov. 19, 2009

Related U.S. Application Data

(60) Provisional application No. 61/052,887, filed on May 13, 2008.

(51) Int. Cl.
*G06F 17/30* (2006.01)
*H04L 29/06* (2006.01)

(52) U.S. Cl.
CPC ........ *H04L 63/145* (2013.01); *G06F 17/30864* (2013.01)

(58) Field of Classification Search
None
See application file for complete search history.

(56) References Cited

U.S. PATENT DOCUMENTS

| | | | | |
|---|---|---|---|---|
| 7,293,017 | B2 * | 11/2007 | Hurst-Hiller et al. | 707/740 |
| 7,845,005 | B2 * | 11/2010 | Kelley et al. | 726/22 |
| 7,953,984 | B1 * | 5/2011 | Chung et al. | 713/188 |
| 2002/0042784 | A1 * | 4/2002 | Kerven et al. | 706/12 |
| 2002/0078230 | A1 * | 6/2002 | Hals et al. | 709/238 |
| 2003/0080995 | A1 * | 5/2003 | Tenenbaum et al. | 345/738 |
| 2003/0097591 | A1 * | 5/2003 | Pham et al. | 713/201 |
| 2003/0110168 | A1 * | 6/2003 | Kester et al. | 707/6 |
| 2004/0003284 | A1 * | 1/2004 | Campbell et al. | 713/201 |
| 2004/0148281 | A1 * | 7/2004 | Bates et al. | 707/3 |
| 2005/0022016 | A1 * | 1/2005 | Shipp | 713/201 |
| 2005/0060404 | A1 * | 3/2005 | Ahlander et al. | 709/224 |
| 2006/0004716 | A1 * | 1/2006 | Hurst-Hiller et al. | 707/3 |
| 2006/0069675 | A1 * | 3/2006 | Ogilvie | 707/3 |
| 2006/0075494 | A1 * | 4/2006 | Bertman et al. | 726/22 |
| 2006/0101514 | A1 * | 5/2006 | Milener et al. | 726/22 |
| 2007/0156604 | A1 * | 7/2007 | James | 705/64 |
| 2008/0183670 | A1 * | 7/2008 | Best et al. | 707/3 |

OTHER PUBLICATIONS

Signal Hill, "Grisoft Acquires Exploit Prevention Labs, Developer of LinkScanner Safe Surfing Technology." Dec. 5, 2007. <http://www.signalhill.com/transactions.asp?newsid=189>.*

* cited by examiner

*Primary Examiner* — Syed Hasan (74) *Attorney, Agent, or Firm* — Howison & Arnott, LLP (57) ABSTRACT

An Internet infrastructure that supports search operations along with malware screening that uses a search server of a search string from a client device. The search server comprises a search engine for searching the Internet and contains modules for malware detection and quarantine functions. The search server identifies the malwares in the search results, generates malware metadata, and provides appropriate messages to the client device that initiated the search service so the user can avoid malware while browsing and searching Internet. The search results that span to a desired level of sub-domain Universal Resource Locators (URLs) and links are quarantined and denied access when found to be infected with malwares. The associated status messages of the search results are displayed with color code and a popup window displays all the information about the searched links when accessed.

16 Claims, 8 Drawing Sheets

Search Engine's Web Page (www.searchengine.com) 407

Web 411  Image 413  Video 415  Local 417  News 419  More 421

423 — Key Word [                              ]  Search 427

Search 429   ⊙Web 431   ○Pages from India 433   Big Shoe 425

1. BigShoes.com  435   [Scanned for Malware two days back "safe to use" 449]○
   BigShoes.com Offering large size shoes for men......
   www.bigshoes.com   More from this website 2. Big Shoe Graphic Design 437   [Malware: Contains virus 451]
   Provides web, graphics, logo, and print design services. Based in Toronto,Ontario,Canada...
   www.bigshoe.net   More from this website 3. Big Shoe Bazar 439   [Scanned for Malware six months back "needs scanning" 453]⊙
   Choose from 1500 shoe designs. Trusted and verified...
   www.bigshoebazar.com   More from this website 4. Really Big Shoe 441   Caution 459
   Choose big shoes for variety of utilities......
   www.reallybigshoe.com   More from this website 5. Atlanta Custom Shoe 443   [Malware: Contains spywa
   Custom shoe store for larger size athletic, dress and casual st
   www.largefeet.com   More from this website

- Contains virus
- Scanned one year back
- Spyware in the mens shoe category link
- Contains unknown malware in ladies shoe link

471

(Prev. 445)  1,2,3,4,5,6,....  (Next 447)

Search 463   ⊙Web 465   ○Pages from India 467   Big Shoe 461

Search 469

INTERNET SEARCH ENGINE PREVENTING VIRUS EXCHANGE

CROSS REFERENCES TO PRIORITY APPLICATIONS

This application claims priority under 35 U.S.C. 119(e) to U.S. Provisional Application Ser. No. 61/052,887, filed May 13, 2008, and entitled "INTERNET SEARCH ENGINE PREVENTING VIRUS EXCHANGE, which is incorporated herein by reference in its entirety for all purposes.

BACKGROUND

1. Technical Field

The present invention relates generally to Internet searching; and, more particularly, to virus infection prevention during such searching.

2. Related Art

Today, in the information age, the Internet is used extensively in almost all walks of life. There are millions of web pages containing information on amazing variety of topics. Internet search engines allow for searching the variety of information on the Internet. There are many search engines available today for getting useful information from the Internet. A search conducted with a search engine will often provide links to various web pages containing data of possible interest to the searching user. This data may sometimes be infected with malware, such as adware, spyware, viruses, etc. Usually, there is no information available for a user to know whether the data they are receiving or viewing while searching the Internet on a browser are infected by malware a priori. In some cases, computers may have software that scan for malware after the malware has been provided to the computer and infected it or caused significant damage to the client machine. Therefore, it is problematic that, after getting the search result, a user has no clue whether the retrieved data has been scanned for malware or whether any malware was found until it is too late. Even if the retrieved data were scanned for malware, how recently the data was scanned for malware is also not communicated to the user. Therefore, there is no way for a user that is browsing the Internet to safely know that the information the browser is accessing in response to search queries is safe for viewing, storage, or processing on their computer.

Quite often the virus vectors, programming, protocols, patterns, operation, etc., keep on changing and hence the virus data scans that were performed in the past may be less useful and less safe as time goes on. Hence there is often little or no indication for the user regarding the safety of the associated links/data provided by the Internet search engine until it is too late, if any warning or remedy is provided at all. In addition, even if the current page is safe to use, there is no information conveyed to the user regarding the search result page, wherein the web links leading to other web links that may contain malware. Meaning, that malware may not appear on the surface of a provided web page. Malware may be embedded in content, media, pictures, sub-links, associated web pages, ads, etc., associated with link provided to the user in response to their search. Therefore, as a user advances through search results and clicks and accesses more content and data, the risk of running into an undetected and unscanned virus increases dramatically.

For example, assume a user wants to find and download free software on the Internet. The user performs a keyword search using a browser and gets some search hits in the web browser. The search hits provide web links or search results to various websites or locations that may be associated with the desired free software. The user has no information about the web links that give the user any comfort that the data within the links or data already provided to the user's browser as a result of the searching doesn't have data containing malware. Even if no virus has yet been exposed to the user, the user may surf a bunch of search results (some completely undesired by the user or unrelated to what the user seeks) or did into search results while trying to find the free software. The user may click on media, or ads along the way. When the user clicks a web link or other data/content, there is a possibility that the user gets a virus from that interaction. Further, once the user finds the software he/she is seeking, the software may be virus-infected software and by accessing or downloading that software and installing it onto the local computer, the computer may get infected by the viruses/malware.

These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
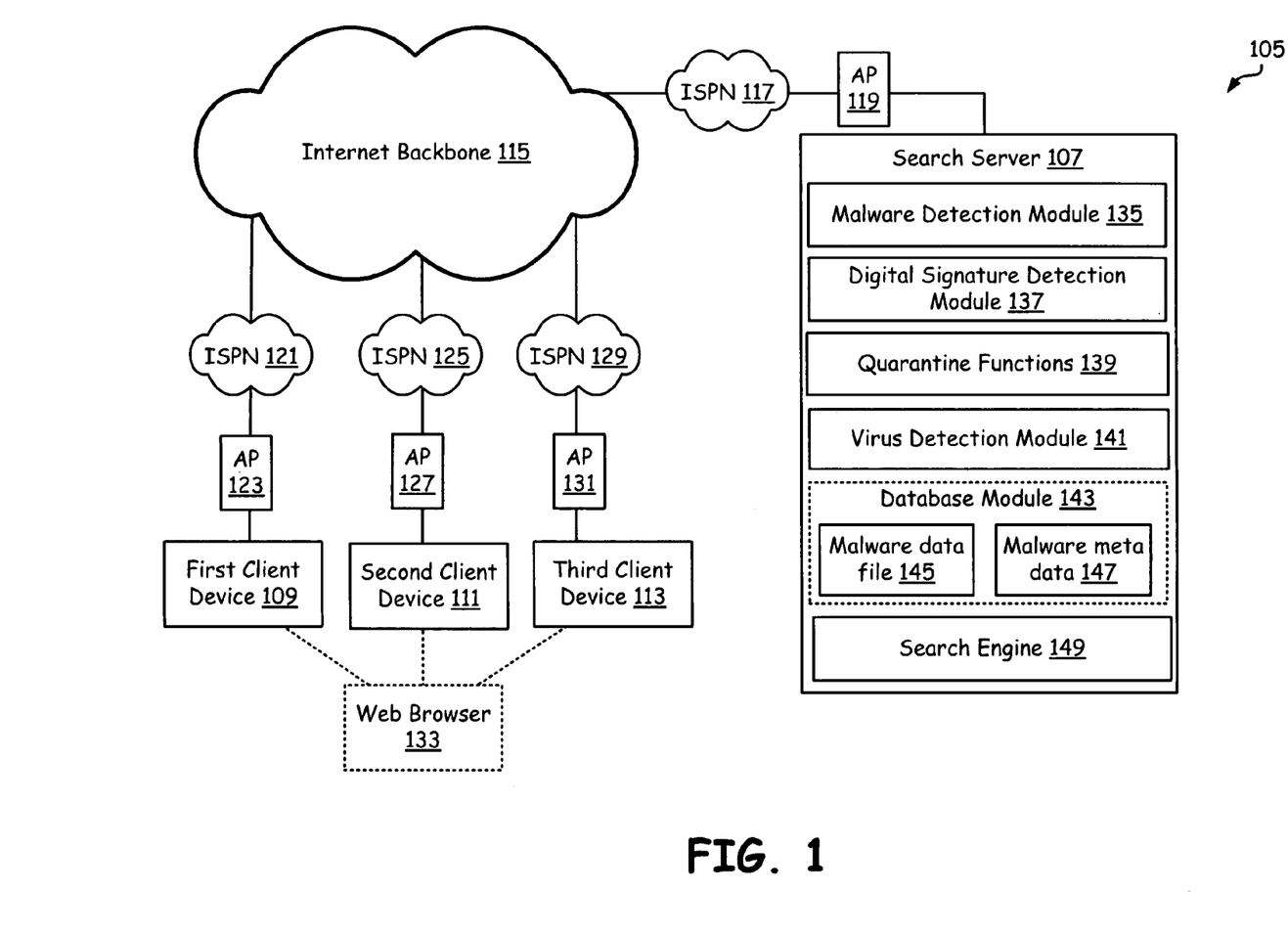
FIG. 1 is a schematic block diagram illustrating an Internet infrastructure containing a search server that searches for user-desired web pages in response to search queries and searches for or attempts to detect and isolate or correct malware associated with the web pages and their contained content when such data is requested by client devices.

FIG. 1 is a schematic block diagram 105 illustrating an Internet infrastructure containing a search server 107. The search server 107 searches for the web pages on or over the Internet and while doing so, scans the search results, provided content, data, etc., for malwares therein or associated with the search results when the search results are requested, processed, viewed, clicked on, or otherwise interacted on or requested by client devices, such as client devices 109, 111 and 113 in FIG. 1. Often, the malware scanning is done real time while the user is requesting or browsing search results or data embedded therein. And, the malware screening can isolate or quarantine suspect or unscanned data or search result content until it can be properly real-time cleared of malware content. If malware content is detected and cannot be removed or remedied, then that content will be flagged with a warning message for the user and the client device, server, or the user can elect to ignore, delete, repair, quarantine, or otherwise process or go around the malware affected content to prevent computer infection.

When a user makes a request for a search (e.g. performs a key word search) through a client device's interface (such as a web browser 133), the search server scans for malware(s) using its different components. If the browser or related malware plug-ins, routines, hardware, firmware, etc., can authenticate the content as being secure and malware free or verify through scans and processing that no malware exists that is being provided access to the client device, then the browser can elect to produce the search results, links thereto, and/or their related content/media in the client device web browser 133. In addition, the search results, content, media, etc., can be provided to the user along with any pertinent malware information that the user may desire. For example, if a virus was found and corrected, the message may be "Your browser discovered a virus ABC within this search result www.usatoday.com/news/worldnews.html but was able to remove or quarantine the viral code." In another example, the message may be "You browser has discovered a virus ANC in this search result and recommends that the user not request or process any data from this page as this browser was unable to fix or protect your computer from the viral condition". With these warning messages, the user may be provided with option to continue, scan for viruses, remove data from his machine, avoid certain web content, change security profiles, terminate the search, modify the search, etc.

The search server 107 and the client devices 109, 111 and 113 may be geographically located anywhere, and are connected to an Internet backbone 109 via ISPNs (Internet Service Provider's Networks) such as ISPNs 117, 121, 125 and 129 and APs (Access Points) such as APs 119, 123, 127 and 131 in FIG. 1. The search server 107 contains server applications such as malware detection module 135, digital signature detection module 137, quarantine functions 139, virus detection module 141 and database module 143. These components or modules 135, 137, 139, 141, and 143 may be used to help the search server 107 screen for malware codes in the packets of data and content provided to the computer or pointed to by links in the search results. If viral content or malware is found, it can be messaged to the user, corrected/remedied when possible, quarantined if needed, etc. In some cases, the browser may decide to notify the IT professionals or user of the malware infected content that their machine is affected by a virus, and give information related thereto to this other user or IT professional to help them purge this viral information off their servers or client devices before other Internet users are infected. The database module 143 contains a malware data file(s) 145, malware meta data are 147, and also a quarantine storage area (not expressly shown in FIG. 1) to quarantine packets containing malware codes. Database module 143 or server 107 may also contain communication applications using communication paths/URLs (Universal Resource Locators).

The search server 107 may have to decrypt any encrypted packets to perform effective malware detection, as such detected is difficult if performed on encrypted data. Therefore, if various data packets arrive in an encrypted state and if further malware analysis is indicated or needed, then the search server 107 proceeds with decryption of the packet to commence the malware detection. When doing such encryption and decryption operations, a public encryption key may be made available either from the server 107 or the client devices 109, 111, 113, while the private encryption key may remain known only to the corresponding client device 109, 111, or 113 in order to preserve data integrity, confidentiality, and security.

The quarantine and communication application functionalities of FIG. 1 selectively include, but are not limited to, sending messages to the client devices 109, 111 and 113 about malware presence or lack thereof, and may also engage in interrupting or aborting of the transmission or delivery of underlying data packets, links, or data, if malware is found. As used herein, the term "malware" also includes unwanted or inappropriate adware, spyware, virus files, and illegal content or distributions. "Illegal content" may include content banned by laws of any pertinent state or country, such as gambling sites, child pornography content, terrorist traffic, content that creates copyright violations (e.g., digital rights management enforcement), etc. "Illegal distribution" relates to the unauthorized distribution of otherwise legal content, such as unauthorized distribution of copyrighted materials. Together, malware, illegal content, and content sent via illegal distribution are generally referred to herein as "malware codes" or "malware data" or "malware executables." Malware codes, etc., may also comprise the program codes of a virus, worm, Trojan horses, spybots, or may simply be unwanted adware. Certain malware codes or data are characterized by their ability to disrupt normal functioning of a client device 121, peripherals, or related hardware and/or software. Adverse affects can include slowing down the device, annoying the users by unwanted popup and advertisements, channeling private information outside of the device in an unwanted manner, engaging in illegal conduct, changing user set characteristics of the device, changing the registry, provided bad data to the computer client device, destroying user data, combinations thereof, etc. In other words, the above-mentioned malware may include virus codes or virus bit sequences, viral content, adware codes or adware bit sequences, spyware codes or spyware bit sequences, worm codes or worm bit sequences, Trojan horse codes or Trojan horse bit sequences, and illegal content and/or distributions.

The malware warning messages sent by the communication applications of the server 107 or the clients 109-113 may include a title such as "Malware Warning!", and a brief description of the type of the malware detected, sender's and receiver's IP address and/or domain names, suggested remedies for the detected malware, a description of the known risk factors or side effects of the malware and some other details. The message(s) may give a brief description of the date and time when the malware was scanned or discovered, a current status with some color coded indication of how much more scanning, quarantine, or repair may be necessary to remedy the malware problem. The communication message may also include information relating to the risk factors, side effects, operation, and actions of the malware, such as "<<Malware type and Code Number>>: with HIGH RISK FACTOR, affects your PC registry and may disable <<one or more application related activities>>" or "<<Malware type and Code Number>>: with MEDIUM RISK FACTOR, produces unwanted and misleading popup."

The malware detection module 135 of FIG. 1, upon receiving the search results, data, media, html, or other information in response to processing of the searching functions or search strings, scans the received information for malwares such as addwares, spywares and viruses. If there is a malware detection event, a digital signature or data tag is assigned to the scanned file(s)/URLs that contain the malware-related information. The signature indicates when the scan was done and what types of malwares were detected. If no malwares were found/or the malwares are cleared, repaired, segmented out, deleted, or otherwise safely bypassed, the data and its source is given a clear status so that the search server need not perform the malware screening completely again so long as the current data maintains its current state. Therefore, servers and clients can use the digital signature as a means for making an informed decision about what level of malware screening is needed for a specific set of data.

The digital signature detection module 137 searches for prior authenticated digital signatures associated with downloaded content. These digital signatures are authenticated by the search server 107. If authentic, the digital signatures indicate that the download or upload file being received or previously received has been previously analyzed for malware and no malware was found. Given no malware was found and the state of the provided data has not been changed, there is no need to reanalyze these malware-clean files, pages, downloads and/or uploads. In such cases where a valid and authentic digital signature is attached to the packets, the search server 107 can choose to bypass or will bypass the packets from further current malware screening. The search server 107 merely checks the packets for digital signature that ensures that the packet contents are not changed since the digital signature is attached, and then the data is safe data to transmit or receive without further malware processing. Any alteration or revisions of data packets, content, or received files would trigger a reset in the digital signature and result in more malware detection for the transmitted content/data. For example, if a file is downloaded from the server 107 by more than one user and a clean digital signature is attached once, it may not be necessary to verify for malware codes during the later downloads of the file by other users, thereby saving power, compute cycles, time, resources, etc.

Figure 3:
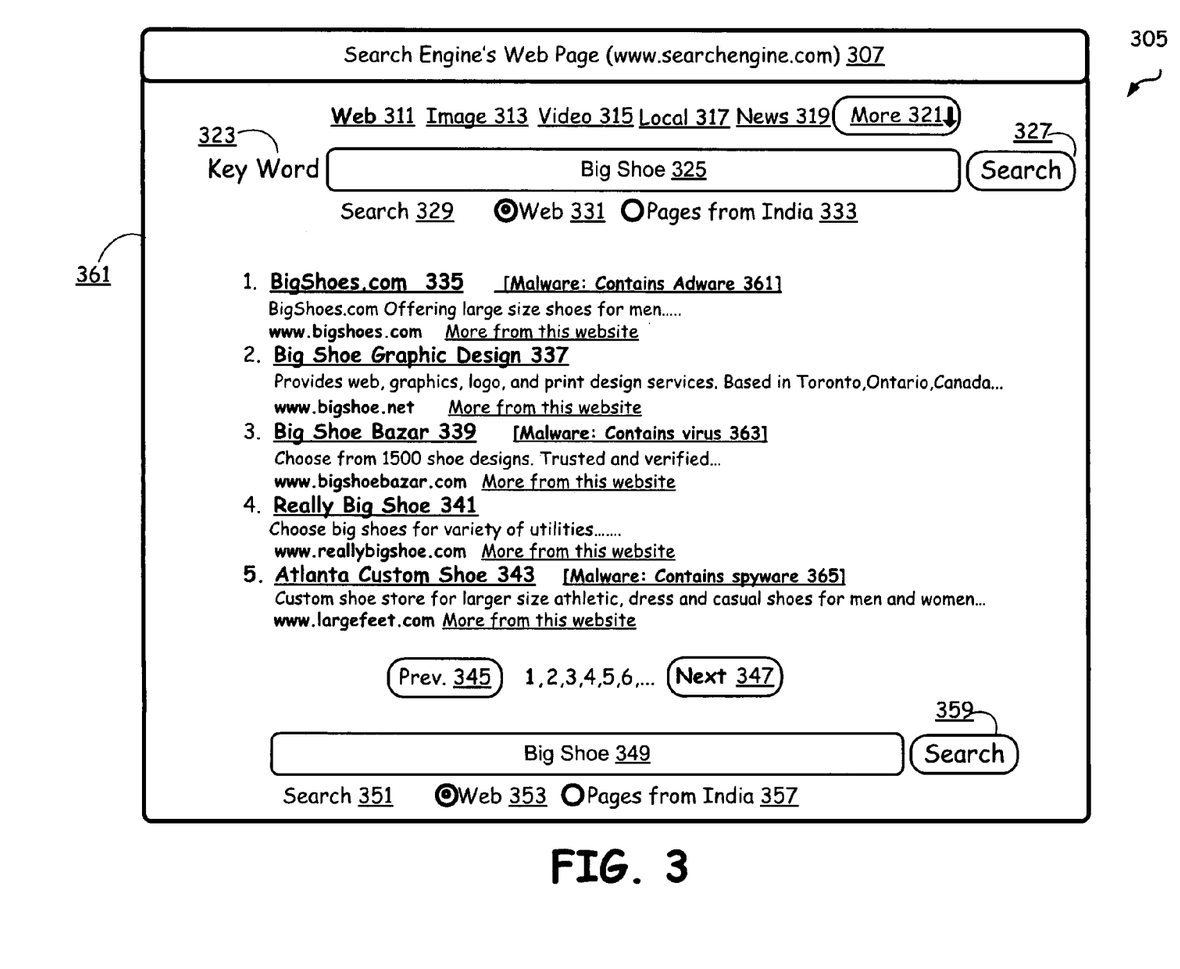
FIG. 3 is a screen shot diagram illustrating a screen shot of the search results along with provided malware information when invoked by a client device.

In one embodiment, a user is trying to search for a list of available URLs to get information about a particular search keyword using the web browser 133 of the client device 109. Web browser 133 may be separate programs across all the clients or may be shared resource on a single server in the case of dumb terminals or thin clients. The search server searches for the URLs and displays the result (see FIG. 3 as one example). Like any other search engine, the search results are displayed with a bit of information about each links. According to one embodiment, the search server also displays the malware metadata along with date and time as shown in FIG. 3, when the URLs content were scanned, and possibly a message showing whether it is safe to download, access, or use the link.

In another embodiment, a mobile phone user may want to download a particular song in a required format, such as MIDI for ring tone searches or MP3 for music, by providing a keyword in the browsing interface of the mobile phone. The search server searches for the ring tones, songs, or special formatted content in the available URLs from the search database. Once it finds the desired content in the URLs, it also scans for malware. The search server displays a message on the client device browser screen about the availability of the ring tone, song, or media, the malware information and the degree of risk to download from that link. The user can then easily choose the necessary link and download the required content with confidence that such action will not contaminate his client device or result in hard or degradation to his client device.

Figure 2:
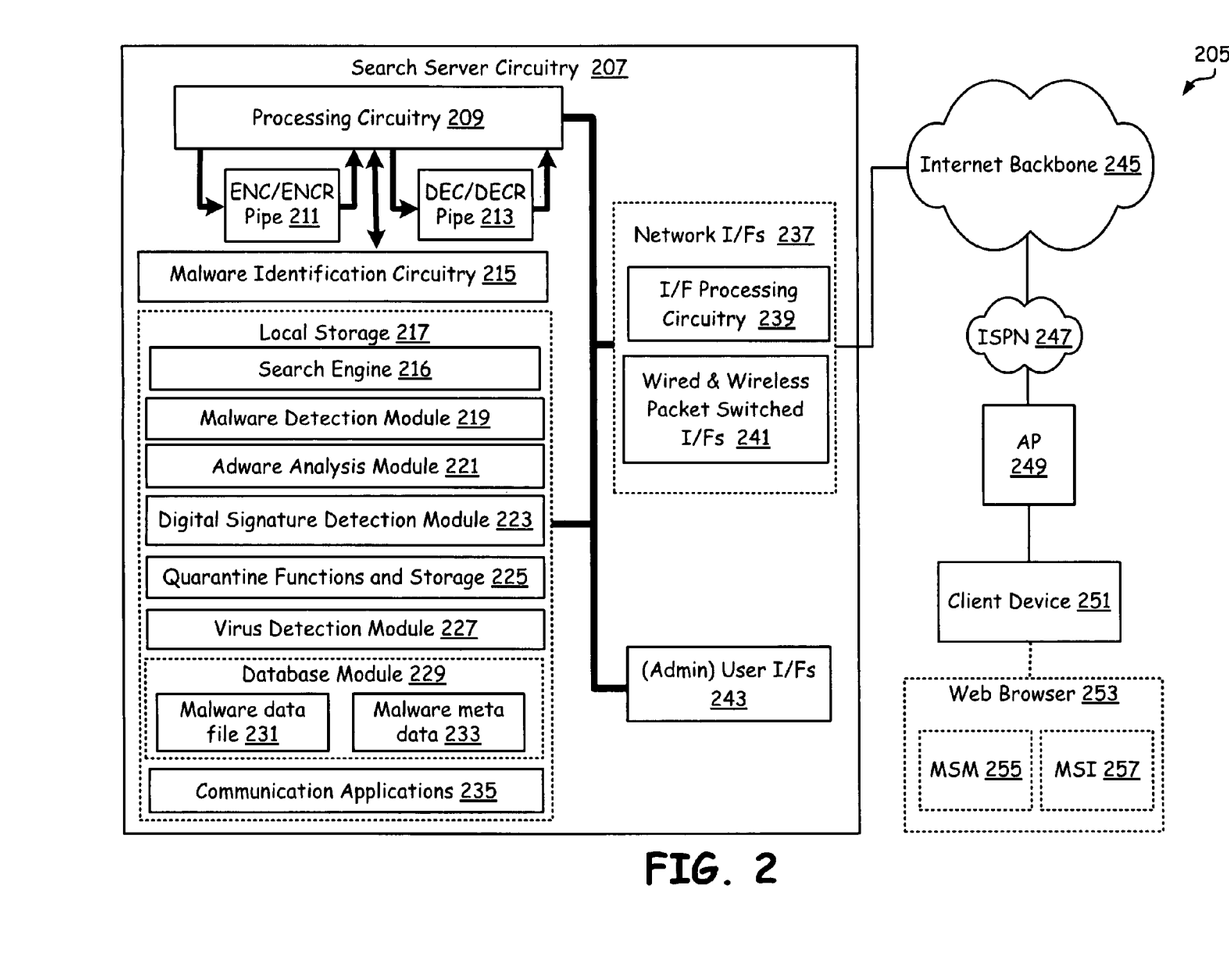
FIG. 2 is a schematic block diagram illustrating in more detail the components of a search server and its interaction with a client device as previously illustrated in FIG. 1.

FIG. 2 is a schematic block diagram 205 illustrating in more detail the components of the search server 107 of FIG. 1 and its interaction with a single client device 251 (only one is shown for simplicity). In addition, FIG. 2 shows an Internet backbone 245 that communicatively couples to a client device 251 through an ISPN 247 and AP 249. The Internet backbone 245 also communicatively couples to the search server circuitry 207 through an ISPN and AP (not specifically shown in the figure for simplicity). The support server circuitry 207 may, in part or in full, be incorporated into any computing device, workstation, server, PC, virtual machine, etc, that is capable of serving as an Internet based server. The search server circuitry 207 generally includes processing circuitry (usually one or more central processing units (CPUs)) 209, local storage 217, a network interface 237, and user (admin) interface 243. These components are communicatively coupled to one another via one or more of a system bus, dedicated communication pathways, or other direct or indirect communication pathways that can be wireline, wireless, optical, or some other connection protocol.

The processing circuitry 209 may be, in various embodiments, a microprocessor, a digital signal processor (DSP), a state machine, an application specific integrated circuit (ASIC), a field programming gate array (FPGA), a graphics processing unit (GPU), any one or more CPU cores, any combination o the foregoing, or any other processing circuitry that can perform any computer operations. The processing circuitry 209 is communicatively coupled to an encoding/encryption pipe 211, a decoding/decryption pipe 213 and malware identification circuitry 215. These hardware and/or software components 211, 213 and 215 may be hardwired, placed in firmware, function in software or be any combination thereof to increase the speed of malware identification and quarantining, improve security, improve the ability to upgrade and modify, etc.

Local storage 217 may be static and/or dynamic random access memory (RAM), read-only memory (ROM), flash memory, nonvolatile memory, a disk drive, an optical drive, or another type of memory that is operable to store computer instructions and data. The local storage 217 contains primarily the search engine 216 that searches for available URLs from the database managed by database module 229 or from one or more offsite servers across the Internet that serve as DNS servers) and malware detection module 219. It also has an adware analysis module 221, digital signal detection module 223, quarantine functions and storage 225 and communication applications 235. The malware detection module scans for different types of malware that may be present.

The search engine 216 in FIG. 2 searches for the user input search strings and stores the searched URLs in the database or some other accessible memory storage area. Generally, the search engine 216 utilizes different search algorithms in series or parallel across many servers to search efficiently for the key word searches by crawling through the Internet or requested databases. Each domain and sub domain URLs are stored for important keywords and later searching/processing in the database during the crawling process. Once a new keyword is submitted by a user, the search server looks for the existing word in the database and retrieves the search result(s). If the word does not exist, then the search engine crawls through the Internet and the associated searched web URLs are stored in the database.

The digital signature detection module 223 searches for digital signatures, checksums, or like data that indicate the authenticity of the data in the searched URLs and often the condition of its malware-free state. The digital signature may be attached to the data packets or files by trusted URLs or a trusted server. Such prior authenticated clean/malware-free files, pages, downloads and/or uploads that contain digital signatures may be bypassed from malware screening by the malware detection module 219 or may be run through simpler or less stringent malware processing that looks only for major malware contamination or problems. The search server circuitry 207 checks the packets for authenticity of the digital signature or like constructs to ensure that the packet contents are not changed since the digital signature was processed and attached. If the packets or data was altered and therefore not properly associated with digital signature, then processing will detect this problem and force the data to be fully scanned for malware and request that the trusted site rerun and reauthenticate all its malware processes and signature processes on that delivered content.

The network interfaces 237 contain wired and/or wireless packet switched interfaces 241. The network interfaces 237 may also contain built-in or an independent interface processing circuitry 239. The network interfaces 237 allow network devices to communicate with other network devices and allow processing circuitry 209 to receive and send packets or data, which may or may not contain malware code sequences. The user interface 243, which is often used for administrative purposes for the search server circuitry 207, may include a display and keypad interface as well as other user interfaces and data connections/peripherals. These user or admin interfaces 243 allow an IT professional or the user of the search server 207 to control, adjust, and monitor its activities.

The database module 229 contains algorithms, data codes, executables, etc., for all the known types of malware, their functions, and also contains the various methods of curing these malware objects. Once any malware is identified in a given stream of packets or data, the database module 229 stores malware meta data 233 of the searched web pages and may elect to report certain malware information to the client device 251 through the Internet backbone 245.

In one example, a user may want to search for particular software download. the user may search for the software download via the client device web browser by keying in one or more search words indicative or descriptive of the software the user desires. The search server circuitry first searches the available URLs using the search engine in an attempt to find search results that relate to the search words. Once one or many relevant search results are found, the search server circuitry delivers the search results and eventually the downloaded software/files to the client device, once the malware screening is clean, through various wireless or hardwired configuration of encrypting and decrypting through network interface 237.

In one embodiment, the web browser 253 of the client device 251 may have the malware screening module and malware status indicator icons present and active. Here, the malware screening of the searched web pages can be controlled by the MSM module of the web browser itself, while browser operations are ongoing and potentially in real time along with the searching and browsing operations. MSI 257 may help the browser to output the results. These MSI within or associated with the browser 253 of the client devices 251 are often user interactive. When a user places mouse pointer over the searched result, the MSI 257 shows the malware meta data associated with the link and also some instructions indicating the web links, applications, algorithms, processes, precautions, etc., to clean these files/URLs of any detected or suspected malware.

FIG. 3 is an exemplary diagram 305 illustrating a screen shot of a search result page that presents search results along with malware information when invoked to do browsing or searching by a client device, such as client devices 109-113 and client device 251 is FIGS. 1 and 2 respectively. In FIG. 3, the search server's title www.searchserver.com 307 is displayed on the top of the web browser 361. The page of FIG. 3 often has links for Web 311, Image 313, Video 315, Local 317, and News 319 so that different types of search domains can be selected for different input search keywords. A user inputs one or more keywords 323 with logical operands (and, or, not, etc.) and various more power search restrictions and profiles like date, time, language preferences, etc., for a search in the keyword text box 325 and searches available search domains using the search button 327. Further search options are available by clicking the pull down menu More 321. Below the search text box 323, search button select area 329 is indicated with radio button(s) which allows the user to select searches and search domains for regional based web pages (ex. Pages from India 333 in this example) or the entire web 331. The user inputs the keyword for the search and, in the example of FIG. 3, the user has typed in "Big Shoe" as the text input 325 in the keyword text box of FIG. 3. The search results for "big shoe" in the domains selected along with some additional search information are displayed on the screen of FIG. 3 with numbering. The number, display configuration, etc., of the search results per page can be preset by the user, or may be defined by the browser or the OS. Here five search results per page are shown, simply as an example. Below the first five enumerated search results in FIG. 3, page numbers are indicated with current page being highlighted. By using multiple pages, the search interface allows tens, hundreds, thousands or more of search results to be processed for any given search operations or search string. Also there is a button for previous page 345 and a button for next page 347 in FIG. 3. Also at the bottom of the page of FIG. 3, a search text box as the top search text box is present. This has the same keyword such as Big Shoe 349 and the search button 359 to facilitate display of the actual search items and user interface for search in more than one place for the convenience of the user. Also there may once again be presented to the user an option for search domain selection per the search field 351, with the region of web pages to be searched indicated with radio buttons for either the entire web 353 or pages from India 357, as previously discussed. Along side each search result 335-343, the malware information 361-365 is displayed for that search result.

In the current "Big Shoe" search example of FIG. 3, the search result 1, 3 and 5 have some malware information attached to the display page. In the search result 1, which shows the search result "BigShoes.com" as bolded text, and also shows information about the link www.bigshoes.com. According to on embodiment, information about malware is also provided with the search result and search information with bolded text if FIG. 3 shown as "[Malware: Contains Adware]" 361. This web link was scanned as the browser was searching for search results (likely, the browser scanned and found no signature of authentication whereby malware could have been present and the malware scan was commenced while searching for search results) and in this case the contents were found to contain a certain type of adware when the malware screening was done. This information tells a user to be aware of the adware that is present in the link www.bigshoes.com. In other embodiments, a user can click down on this adware information 361 and get more detailed adware information or even get access to data, applications, notes, executables, websites, etc., that can help the user avoid, remove, or limit the harmful affects (if any) of the adware. The search result 2 shows "Big Shoes Graphic Design" 337 which is a link to (www.bigshoe.net) that is in the business of making graphic, logo and print designs for shoes, and the company is located in Toronto, Canada. This link was scanned for malware either before, during, or right after presentation of the search results to the user and the screen shows that either this site was found to be trusted, properly signatured, and malware-safe or was scanned by the browser search server circuitry 207 of FIG. 2 and found to be malware-clean. The interested user(s) can now safely use this link without any problem, as the server, browser, and or related hardware/software applied to the user has determined that this reference does not contain any malware. Note, that the link www.bigshoe.net may contain many sub-links or new URL connections therein. The site www.bigshoe may contain ads, other links to click through, videos that are activated once pressed, executable code, Flash animation, etc. How deeply into the hierarchy of access the malware code detection code can be set by degrees. Therefore, the malware can detect only on the surface inside the search result, or may penetrate into the search result several layers searching those layers for malware. In either case, as the user peruses through the search result, more malware searching may have to be conducted real time while the user clicks into the search result to continue to ensure the safe presentation of data, content, web pages, etc., to the user over time.

The search result 3 in FIG. 3, which is a link to "Big Shoe Bazar" (www.bigshoebazar.com) 339, has already been scanned for malware by the search server, and the user knows before hand that this search result or some portion of it contains a virus from the display [Malware: Contains virus] 363. More information may be provided on the screen as to the specific location, danger rating, ability to avoid/deactivate/delete, etc. within the page of FIG. 3 or by clicking down on the virus warning notice 363. The search result 4, which is for "Really Big Shoe" (www.reallybigshoe.com) 341, does not contain any malware as indicated by the page of FIG. 3. Again, if the user drills deep into the search result 4, eventually the user may run down to a hierarchical level where the browser did not guarantee malware safety and malware processing will have to begin anew with new notices to the user of malware risks as the user is drilling into the search result. However, the search result 5 contains the link for "Atlanta Custom Shoe" (www.atlantashoe.com) 343 and this search results content was found to contain spyware as indicated by the display [Malware: Contains spyware] 365 when scanned by the search server circuitry 207 of FIG. 2. Malware information is displayed adjacent to each of the search results in accordance to the embodiment of FIG. 3 but other ways to present the information in pop-up windows, sub-links, etc, is possible.

In one example, a user keys in the search keyword "free mp3 songs" in the text box 323 and clicks the search button 327. The search server displays search results on the browser screen with its malware status such as "contains spyware . . . ", "contains adware . . . ", and/or "contains virus . . . " etc. It is possible for one site, webpage, or search result to result in many adware warning, many virus warning, and many spyware warnings. Often, after a site is detected as having a certain amount of harmful malware, the browser in FIG. 3 may simply recommend the search result be off-limits to the user for the security and safety of his client device and data thereon, forcing the user to manually override the lock on this search result if the user wants to go forward into a search result this dangerous to the security of their computer. This enables user to be aware of using the search link before actually getting into the link.

Figure 4:
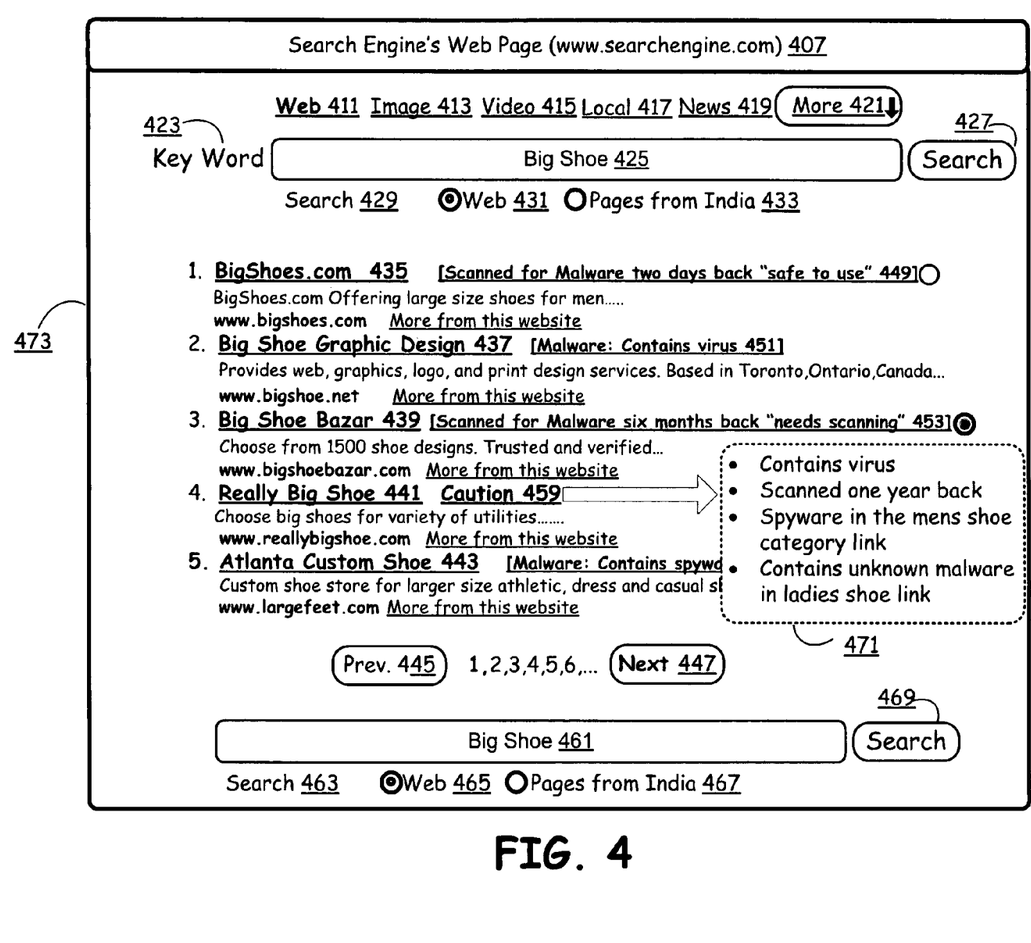
FIG. 4 is a screen shot diagram illustrating a screen shot having a popup window that can be used to display and process malware metadata from the search results invoked by or provided to a client device.

FIG. 4 is an exemplary screen shot diagram illustrating a screen shot having a popup window with malware metadata of the search result invoked by a client device. The search server's title www.searchserver.com 407 is displayed on the top of the web browser 473 of the client device. It has links for Web 411, Image 413, Video 415, Local 417, and News 419 as different types of search for keywords as shown previously for FIG. 3. A user inputs the keyword for search in the keyword text box 423 and searches using the search button 427. Further search options are available by clicking the pull down menu More 421 as previously discussed in FIG. 3. Below the search text box 423, search button 427 is indicated with radio button that enables searches for region based web pages (ex. Pages from India 433) or the entire web 431. In FIG. 4, the user inputs the keyword for search such as Big Shoe 425 in the keyword text box. The search results along with some information are displayed on the screen with numbering. The search results per page can be preset by the user. Here five per page are shown, only as an example. Below the search result, page numbers are indicated with current page being highlighted. Also there is a button for previous page 445 and next page 447. At the bottom, a search box repeats as the top search box, with the keyword such as Big Shoe 461 and the search button 469 to facilitate display of the actual search items and user interface for search. Also there is search option 463, with the region of web pages to be searched is indicated with radio button for the entire web 465 and pages from India 467. Along side each search results, the malware information is displayed.

In the current "Big Shoe" search example, each element or search result on the entire first page has some malware information shown or associated with it. In the search result 1, which shows BigShoes.com 435 as bolded text, information about the link www.bigshoes.com is provided. According to present invention, information about malware is also provided with a bolded text "Scanned for malware two days back and safe to use" 449 with a clean icon indication. This trusted site web link was scanned two days back by the trusted server or another trusted source and the contents were noted to not having any malware, and the content was verified as unchanged since that scan two days ago was performed. This information tells the user that the searched link www.bigshoes.com can be used safely without the need for the user's browser, server, or client to expend a lot of time and resources doing detailed virus scans in real time during the current user search operation.

The search result 2 in FIG. 4 shows Big Shoes Graphic Design 437 that is a link (www.bigshoe.net) for graphic, logo, and print designs, and the company is located in Toronto, Canada. This link was scanned for malware and found to contain one or more viruses. A message [Malware: contains virus] has been displayed alongside the result. This displayed tag enables a user to be aware of virus present in this link and may offer information as to whether the virus can be dynamically avoided if accessed, removed if accessed, or simply should be avoided. Further, the virus notification in element 2 of FIG. 4 may also provide the user with more information as to the virus and how to trigger it and/or what to avoid. For example, the notice may inform the user that the virus is contained within video download contents on www.bigshoe.net and may notify the user to avoid that content. As another example, the window may caution the user not to click on ads in this search result, as that was where the virus was detected. Further, a smart interface can be enabled for the user where if the user does try to click on the ads (the user may forget that was where the virus was), that a warning or help screen intercepts the request and queries/warns the user again about engaging in this interaction before allowing the user to do so (or taking corrective action before or after the user does engage in that interaction that exposes them to the potential virus).

The search result 3 is a link to Big Shoe Bazar (www.bigshoebazar.com) 439 and this search result content had been scanned for malware by the search server about six months back. The user gets to know the current status "Scanned for malware six months back and needs scanning" 463 with a grey icon. The level of grayness may be used to indicate the cleanness of the link being searched. Hence the user becomes aware of the current status and can opt for cleaning depending on the importance of the link to be used. Further, at some point the content will get to the point where its status has changed and its risk of being contaminated it too high to ignore and where malware scanning must again be done and/or the trusted server on which this content resides may be notified to update the signatures and malware status of its content.

The search result 4 of FIG. 4, which is for Really Big Shoe (www.reallybigshoe.com) 441, displays a caution message 459. When a user puts a pointing device, such as a mouse, over this word, a pop up window appears which describe the characteristics of the link. A typical pop up window is displayed in window 471 of FIG. 4 and shows the link may contain a virus, that it was scanned one year back, that it was not accessed by any one since then, and that there are some known malware in the sub domain path leading to men shoe category and there are some unknown malware in the sub domain link leading to women shoe category. This pop up window can even tell information about sub-domain links (or hierarchically deeper content within the search result) and any malware information related thereto apart from just the top-level of the parent links.

The search result 5 containing the link for Atlanta Custom Shoe (www.atlantashoe.com) 443 has spyware from the display [Malware: Contains spyware] 465 scanned by the search server. Malware information is displayed adjacent to each of the search results in accordance to the embodiment of FIG. 4. The malware information can be shown as a grey icon adjacent to the link showing the degree of cleanness and a pop up window for each search result can provide better information of each link.

In another example, a user may key in the search keyword "free ripping software" in the text box 423 and click the search button 427. The search server displays search results on the browser screen of client device with its malware information. The malware information is displayed in the form of a grey color (or other color scheme such as red for a bad virus, yellow for a caution, and green as malware free, with various shades, sizes, or boldfaced options of these colors to show severity, etc) indicating how recently the malware was scanned and a pop up window describes the malware information such as malware present if any, malware type, what type of instabilities these malware can create, method of curing by providing a web link, etc.

Figure 5:
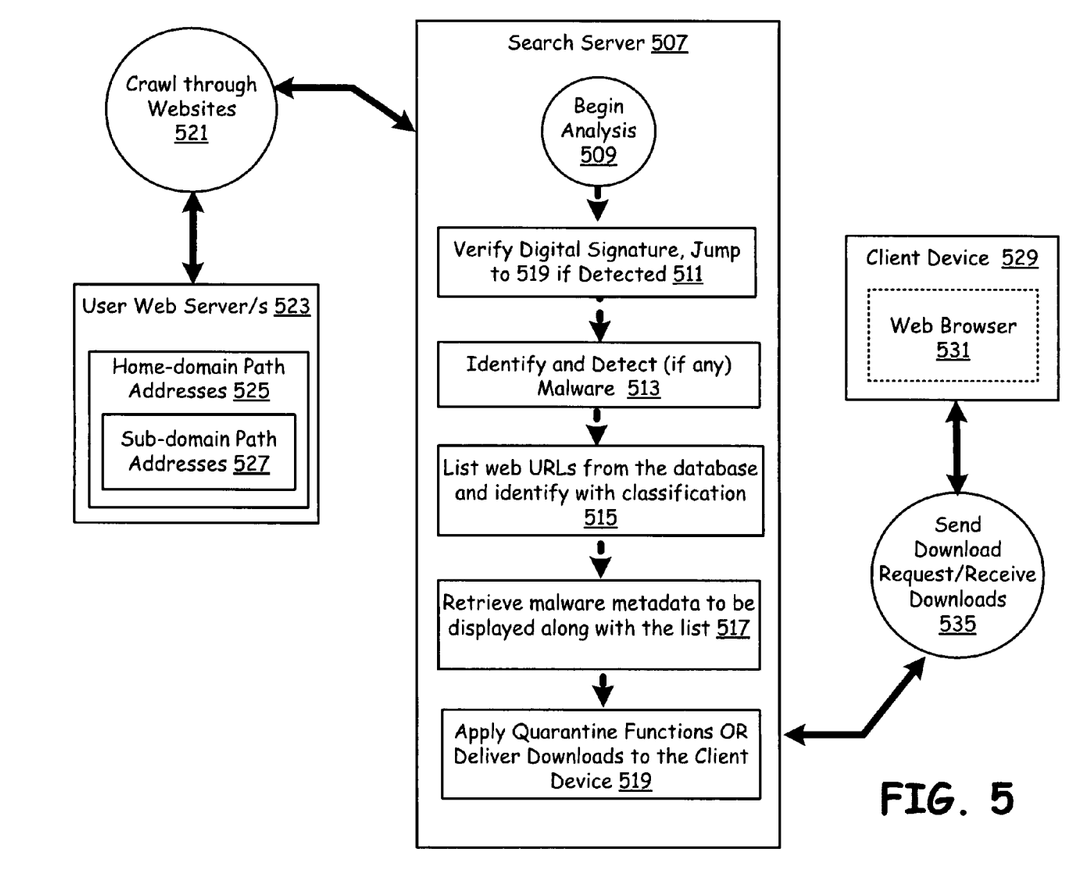
FIG. 5 is a schematic block diagram illustrating the events that occur over the Internet infrastructure of FIG. 1 during a search invoked by a user on a client device.

FIG. 5 is a schematic block diagram illustrating the events that occur in the Internet infrastructure of FIG. 1 during a search invoked by a client device where the search server 507 performs the malware screening. The search server 507 continuously crawls through web sites 521 on the Internet for different user web servers 523 with its home domain address 525 and sub domain address 527 searching for important key words and storing the search result links in the database.

When a user invokes a keyword search, the search server searches the database as a function of the keywords and displays the corresponding links that correlate to the keyword (s) as search result.

The search event begins with client device 529 sending a request 533 to search particular key word(s) or data through its web browser interface 531. The search server begins the analysis 509 by using the search engine to retrieve the links relating to the keyword(s) or search data from the database. The search server finds the required/relevant web links files and first verifies for the presence, authenticity, and timeliness the digital signatures of each link at a block/step 511. If a valid, clean, malware-free signature is detected and verified, malware analysis can be skipped and the information is sent directly to the client device, possibly with no need for temporary quarantine. If the digital signature is not clean, not timely, not verifiable, etc., or a digital signature is not found associated with the search result, at a next block/step 513, malware detection is carried out by the server and/or client side malware detection/isolation/repair software. At this block/step 513, the malware analysis, detection, correction, isolation, analysis, etc., is carried out. The malware could be adware, spyware, virus, Trojan horses, or any other harmful computer programs associated with the searched links. The search result containing web URLs pertaining to the keyword is retrieved along with malware/data and other classification from the database via a next block/step 513. The malware metadata indicating the date and time the web URLs last scanned (if ever), the type of malware present in the link, the type of damage that it can do to the system, the method of overcoming the malware, etc, are generated at the next block/step 517. The search result along with malware meta data is delivered to the user at one or more client device(s) at a next block/step 519 in FIG. 5. If there is a download request, the data is quarantined in a protected quarantined memory space that has limited, protected, or no access to computer hardware, OS calls, peripherals, etc, if the malware could not be cleared in the searched link or a sufficiently dangerous piece of malware was determined to be present.

In one example, a user wants to search images relating to "Niagara falls" as the keyword, using the web browser interface of the client device. The search server searches the available web pages containing the relevant content along with the malware metadata and malware algorithms/scans as needed. As malware is detected, quarantined, fixed, or found, the malware metadata is displayed to the user as described in the previous figure FIGS. 3-4. The user will eventually wish to download the image, files, data, text, pictures, media, music, etc from a particular interesting web site found from the search result. As the user clicks for the download, the search server verifies that this immediately presented content to the client device is ok or is in need of malware screening again and scans for malware if needed. If it is found to be free from all malware, the search server delivers the search result or enclosed content to the client device. In some cases, partial content will be delivered for the user to view and interact with. The user-desired web page may be delivered with a lot of the original content, but an ad, video clip, executable, link, or one or more of the foregoing may be blocked with a message to the user indicating that this piece of the requested search result, media, or web page contained the offending malware or viral code.

In another example, a user searches for a particular type of job, and the user wants to upload his resume for consideration on a job-posting site. He searches the Internet by typing the required keyword(s) in the web browser. Upon receiving the search result, free of malware, the user wishes to upload resume, clicks on the upload icon. The search server again scans for malware for the upload operation, and if the uploaded data is found to be clean or if it is cleared from all malware based on a valid and timely signature or checksum process, and then the client and server permits the transmission/uploads of the resume/data on the desired web page for job consideration. Such a process works for any upload of any data for any purpose.

Figure 6:
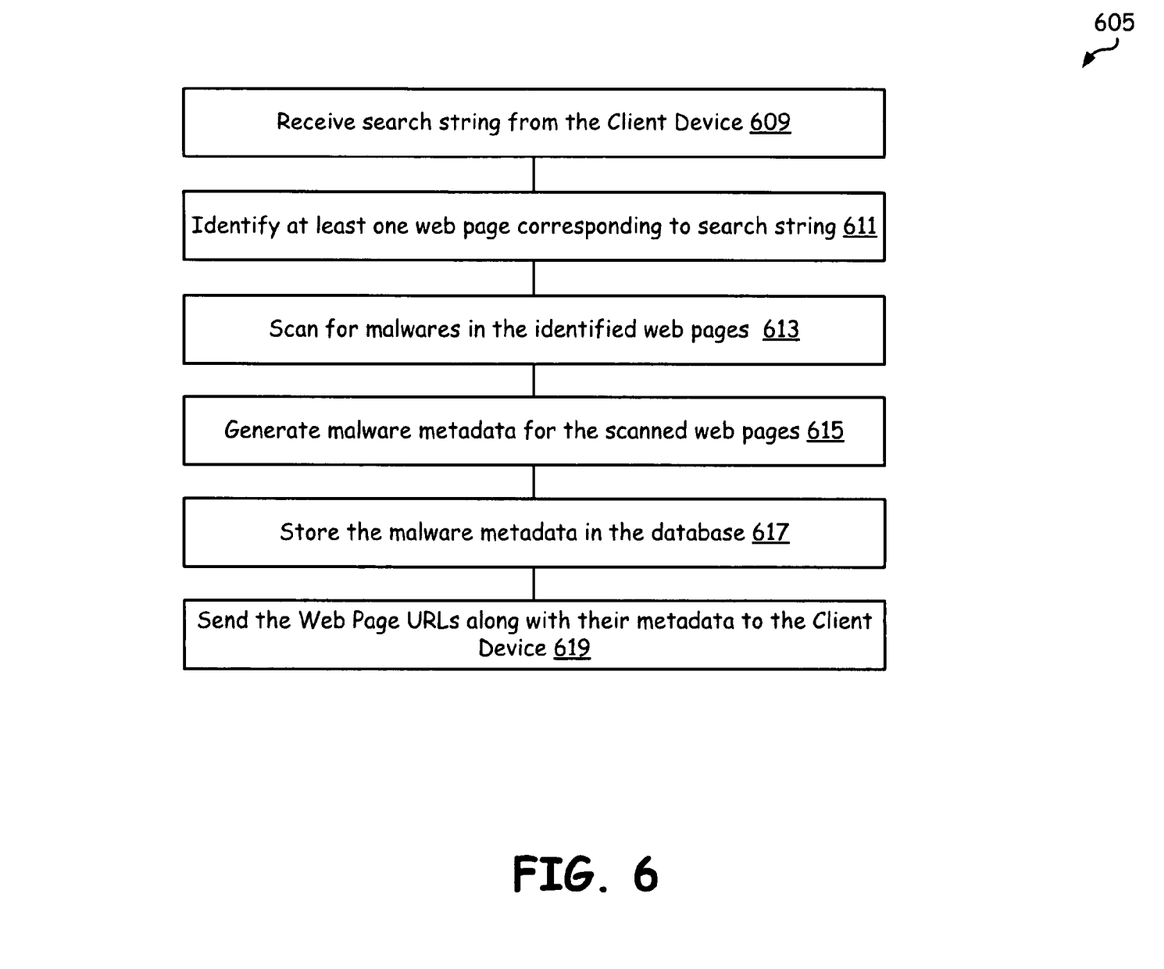
FIG. 6 is a flowchart diagram illustrating in the general functionality of the search server taught herein.

FIG. 6 is a flowchart diagram 605 illustrating in the general functionality of the search server 107 of FIG. 1 in accordance with various embodiments taught herein. The functionality of search server begins at a block/step 609, when the search server receives a search string from the client device. The search server receives the search string from the web browser of the client device. At a next block 611, the search server identifies at least one web page corresponding to the search string using various search algorithms. At a next block 613, the search server performs the malware screening for the searched web pages. Such a process may be hierarchical as the malware screening searches content within each search result web page and various media and data formats therein too. The searched links/media/content may contain one or more virus bit sequences, adware bit sequences, spyware bit sequences, worm bit sequences, Trojan horse bit sequences, and illegal contents and distribution. The search server does malware screening for all the searched web pages and can perform malware screening, detection, isolation, and correction to a user defined sub-domain level. N one embodiment, before performing malware searching, the search server performs digital signature detection. If the digital signatures are present and valid, malware analysis need not be performed. However, if the digital signatures differs, have timed out, are defective, or not clean, the malware analysis is performed. At a next block/step 615 in FIG. 6, the search server, generates malware metadata for each of the relevant searched links. In some embodiments, the processing for malware and collection of metadata needs to only be performed on those search results presented to the user. For example, it is not unusual that a search could result in 20,000 search result "hits." However, few (if any) users have time to go through all these search results. So, in one embodiment, only those 5, 10, or 20 search results (some finite number of search results) displayed to the user for review need be scanned (see FIG. 3-4). In another embodiment, when presenting 5, 10, or 20 search links to the user, no scanning needs to be done as the user may not want to drill down or click on any of those search results on that page. Therefore, in this other embodiment, the system may wait until the user clicks on a search result link or web page before commencing malware scanning and then present the results to the user just before taking (or preventing) the user from access to the search content. The collected and presented malware metadata can indicate how recently the links were scanned with a color-coded indication. A circle with grey shade with white indicating clean and black indicating unsafe and requires further malware screening. The malware metadata also contains the type of malware present such as adware, spyware, viruses, and Trojan horses present in the link and possibly the recommended method(s) to overcome or clean the malware using a web reference.

At a next block/step 617, the generated malware metadata are stored in the database for further retrieval. This metadata is stored along with the link details and in a server specific format for easy access for retrieval. At a next block/step 619, the search results along with the metadata are sent to the client device. This information is displayed on the web browser of the client device for the user or users. The user(s) can take appropriate action by find the search result along with the malware information.

Figure 7:
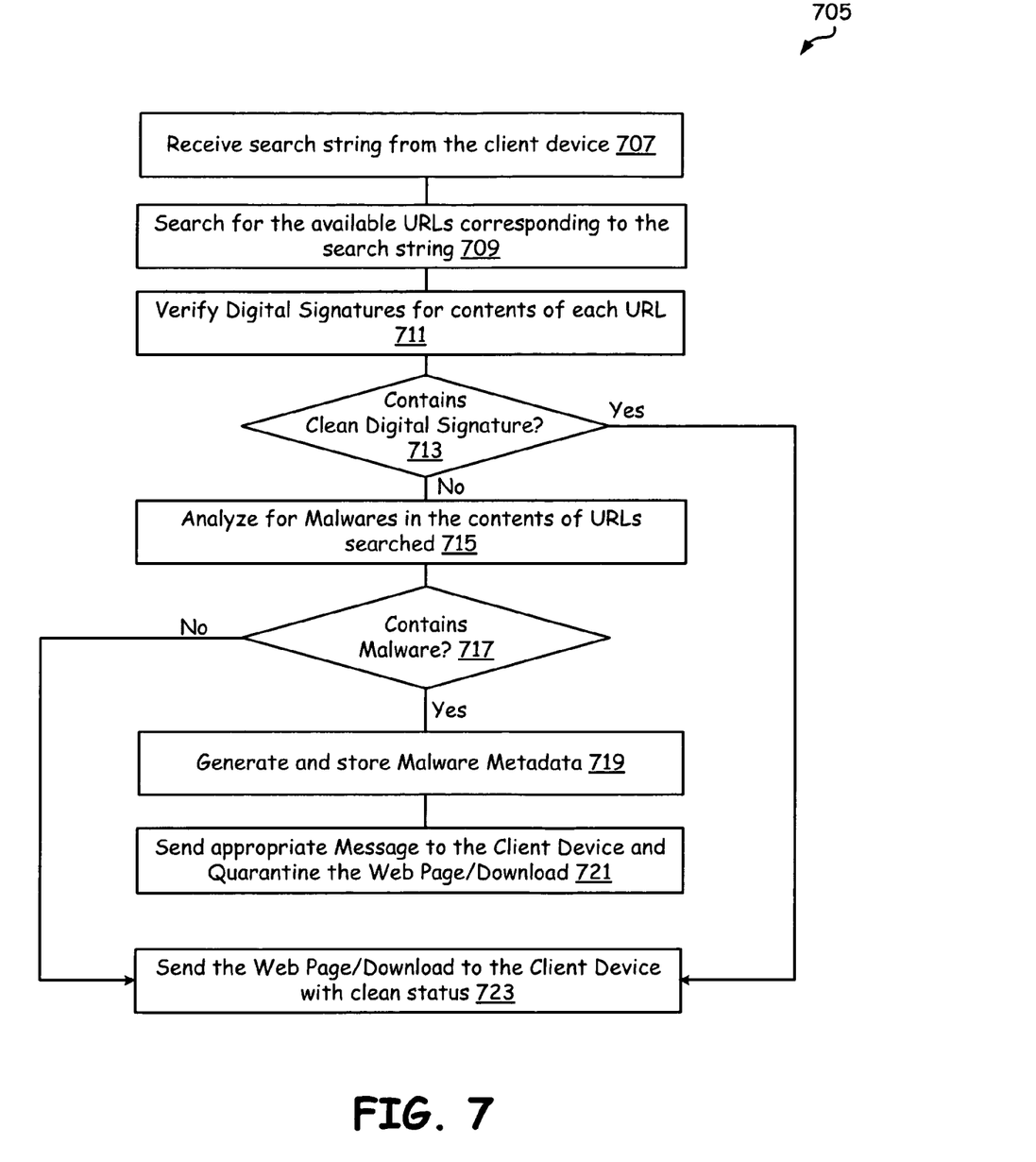
FIG. 7 is a flowchart diagram illustrating the detailed functionality of the search server of FIG. 1.

FIG. 7 is a flowchart diagram 705 illustrating the detailed functionality of the search server of FIG. 1 in accordance with the embodiments taught herein. The functionality of the search server begins at a block/step 707 where the server receives a search string from a client device or devices. At a next block/step, 709, the search server searches for available URLs containing the search strings or correlating thereto using the search engine of FIG. 2. At a next block/step 711, the digital signatures (if any) of the contents of the block are first examined. The digital signature informs the server about the status of the contents of the links/data/content present within. Often, prior authenticated signatures are attached with files if a trusted site is being accessed. If web page content is previously analyzed and the signatures are present and check out, then the page content is given a clean status and there is no need to do malware analysis again. At a decision block/step 713, the authenticity of digital signature is verified. If it is clean, the web page content need not be screened for malware and the web page link is provided to the client device. If the digital signature is not clean or no signatures are present, at a next block/step 715, the contents of the web page are analyzed for the presence of malware. At next block/step 717, various decisions about the malware content are taken. If the contents of the URL contain malware, the associated malware metadata is generated at next block/step 719 and certain quarantine, correction, repair, mitigation, avoidance, or like malware action can be taken. If the malware is not cleared, repaired, avoided, etc., the content is quarantined at a next block/step 721 so that the content of the web page is not downloaded to the client device. As previously discussed, the quarantining can be of the entire download or webpage or may be of just infected portions or pieces of the downloadable content. If there is no malware found in the searched web page, at the block/step 723, the resulting URL and the associated malware metadata with clean status is delivered to the client device and/or releases from safe quarantined memory spaces if such are being used to temporarily store exchanged data pending malware release.

Figure 8:
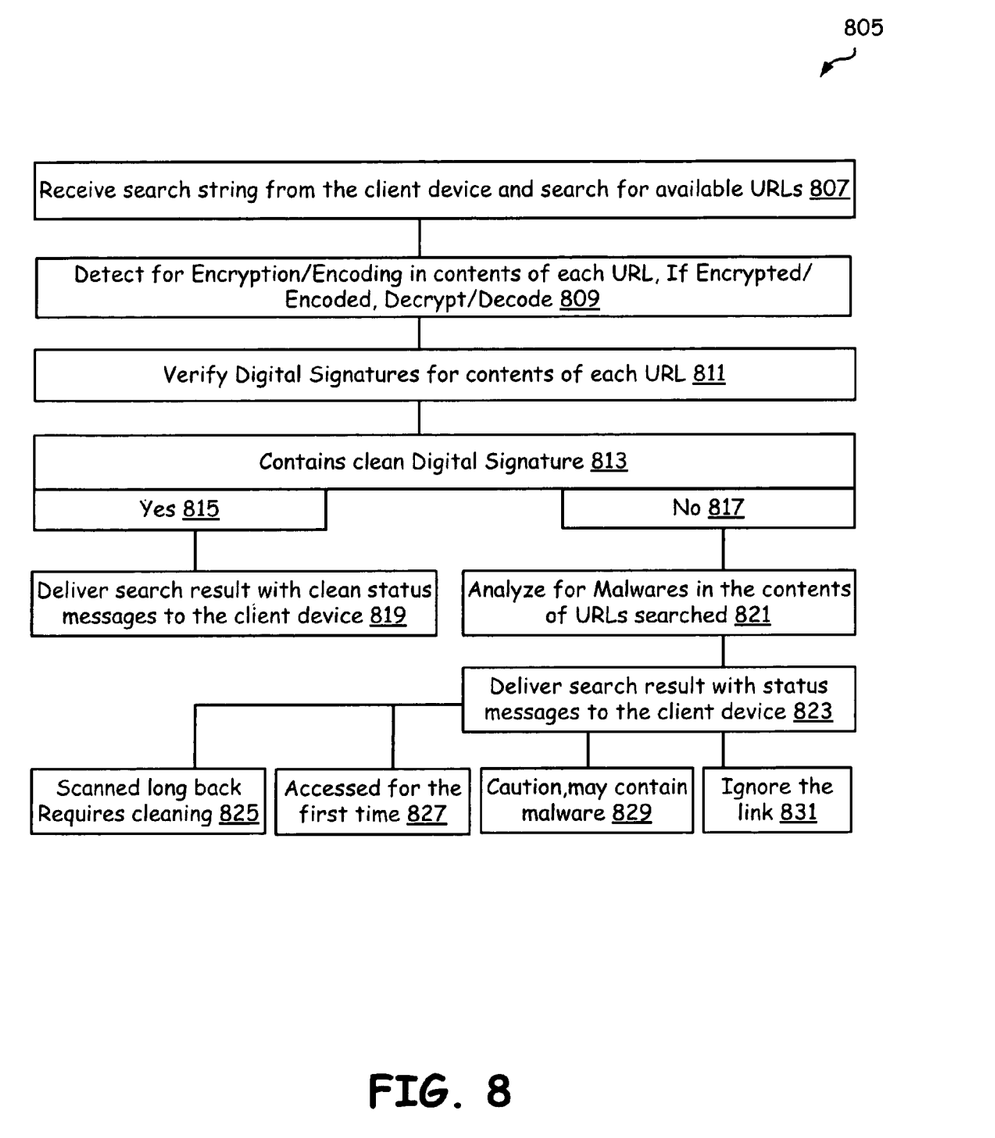
FIG. 8 is a flow diagram illustrating different messages that a search can produce in accordance various embodiments taught herein.

FIG. 8 is a flow diagram 805 illustrating different messages that a search can produce in accordance with the embodiment taught herein. The method flow begins at a block/step 807 where the search server 107 of FIG. 1 receives a search string from the client device and searches for the available URLs based on the search strings. At a next block/step 809, the contents of the URLs are verified for any encryption or encoding. If the contents of the searched URLs found to be encrypted/encoded, the search server decrypts/decodes the content before analyzing the content for malware. At a next block/step 811, the presence of any digital signatures associated with the contents of URL are identified. At a block/step 813, the contents are checked for clean digital signature that can be verified as accurate and valid. The contents are authentic and malware free if the content is unchanged since the last malware scan and the content has a clean digital signature associated therewith, at a block/step 815. If the signature is valid and authenticated, further analysis is not needed and at a later block/step 819, and a status message indicating the link to be clean is delivered is provided to the client device. However, if the contents are found to be associated with a bad digital signature at block/step 817 or if there is no signature data present at all, then the contents of searched URLs are further analyzed for malware at block/step 821. The malware metadata is generated at a block/step 823 and such data delivered to the client device with appropriate status message.

Various status message could be: "scanned long back requires cleaning" 825, "accessed for the first time" 827, "caution, may contain malware" 829, "ignore link" 831. Certain messages may come with certain redaction or deletion of the underlying content to avoid malware exposure, and different messages will come with different invoked client functionality. For example, some messages may prompt the browser or client to not go to the provided content at all, or may require the user to override an explicit warning message to go to the isolated content that was identified as dangerous due to malware.

The first message, "scanned long back requires cleaning" 825 occurs when the content of the link was scanned a long time ago and has the digital signature, but the malware software determines that it is better to malware scan again to reconfirm the malware-free status since the virus vectors can keep changing over a period of time or the state of this content may have aged. The second message "accessed for the first time" 827 occurs when the link is been accessed for the first time and there is no prior information, scans, signatures, etc., about the link/content. This link requires immediate scanning and the search server stores scanned information in the database. The third message "caution may contain virus" 829 occurs when the search server has detected the virus and believes that the system has cleaned or isolated the virus from its malicious/adverse effects. But since the virus vectors keep changing over a period of time, the system may still give a caution message for the user, or request that the user or client device recheck the content again if a user wants to download any files from that link. The fourth message "ignore the link 831" occurs when the search server detects the presence of malware, but unable to clean, repair, isolate, etc., the contents. In these cases, the link, content, etc., may be isolated from access by the user under any circumstances, unless the software provides the user with a manner to override these protections expressly with proper warning that these actions may compromise the security of his machine. The search server produces a message to ignore such links when the detected malware is not completely cleared, highly risky and damages the functioning of client device.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software, such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module may modify the information of a signal in some limited fashions and may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A computing device adapted to be coupled to a network to perform Internet browsing through an Internet browser, the computing device comprising:
   computer memory;
   processing circuitry coupled to the computer memory and operable to generate a search request to be delivered to a search server;
   network interface circuitry coupled to the processing circuitry and the computer memory, the network interface operable to:
   transmit the search request to the search server;
   receive, from the search server, search results and metadata associated with a malware determination made by the search server, the metadata including a notification that the search server has detected malware in at least one particular search result;
   the processing circuitry further operable to:
   determine whether an override of the malware determination made by the search server is permitted;
   present the search results to a display screen of the computing device, but isolate a user of the computing device from linking to content associated with the at least one particular search result unless the processing circuitry determines that an override of the malware determination is permitted; and
   for the at least one particular search result, based upon user input, receive additional information regarding the at least one particular search result and display an indication that a sub-domain link of the at least one particular search result contains malware, the indication including a type of malware corresponding to the sub-domain link.

2. The computing device of claim 1 wherein the computing device processes contents within the search results by altering the contents of the search results for display to the user so that certain browsable content that is malware affected is graphically identified as being affected by the malware on the display screen.

3. The computing device of claim 2 wherein the certain browsable content that is malware affected is graphically identified as being affected by malware on the display screen by a color code provided on the display screen.

4. The computing device of claim 2 wherein the certain browsable content that is malware affected is graphically identified as being affected by the malware on the display screen by a text message provided on the display screen to identify the certain browsable content as being malware affected.

5. The computing device of claim 2 wherein the user is prevented from being able to select or use the certain browsable content that is malware affected while it is on the display screen.

6. The computing device of claim 1 wherein the user requests many search results and browses several items of content using the display screen and wherein the computing device pre-scans the selected search results and content as access to the search results or content is requested by the user wherein the pre-scanning is intended to detect the malware before it is encountered in an adverse manner by the user.

7. The computing device of claim 1 wherein the user requests access to a web page that contains many different types of media and many different sub-links of sources of new information and wherein the computing devices hierarchically scans the many different types of media and many different sub-links of sources for the malware before providing the user with access to the many different types of media and many different sub-links of sources.

8. The computing device of claim 1 wherein the user requests access to a web page and portions that are not malware affected are provided for access to the user and wherein portions that are malware affected are processed to ensure the user is not affected by the malware that is present.

9. The computing device of claim 1 wherein the user performs an Internet search and a plurality of search results are provided to the user in a search list, wherein the contents of the search results are pre-scanned to detect for the malware before the user is allowed to select and enter any search result listed on the display screen.

10. The computing device of claim 1 wherein contents that contain the malware are tagged by a color scheme on the display screen.

11. The computing device of claim 1 wherein contents associated with search results identified by the search server as including the malware are isolated in a secure quarantined memory space of the computing device and not released into a normal memory space of the computing device for normal browsing until the malware scanning by the computing device is complete.

12. The computing device of claim 1 wherein the user is notified of the presence of any contents containing the malware and the user can elect certain remedial actions in response to the presence of the malware.

13. The computing device of claim 1 wherein the browser, user interaction, and display screen are part of a client device.

14. The computing device of claim 1 wherein the source of contents that contain the malware is notified as to the presence of the malware so that malware correction activities can take place at the source.

15. The computing device of claim 1 wherein the contents are encrypted and are decrypted before processing the contents to detect the malware.

16. The computing device of claim 1 wherein the contents are provided with digital signature from a trusted source wherein the digital signature and the contents can be processed quickly to determine that the contents are malware free.

* * * * *